(No Model.)

G. W. NORTH.
CHECK ROW PLANTER.

No. 264,743. Patented Sept. 19, 1882.

WITNESSES:
Fred. G. Dieterich
A. G. Syne

INVENTOR:
Geo. W. North
BY
ATTORNEYS.

UNITED STATES PATENT OFFICE.

GEORGE W. NORTH, OF BURLINGTON, ASSIGNOR OF ONE-HALF TO STEPHEN L. NORTH, OF LEAVENWORTH, KANSAS.

CHECK-ROW PLANTER.

SPECIFICATION forming part of Letters Patent No. 264,743, dated September 19, 1882.

Application filed January 12, 1882. (No model.)

*To all whom it may concern:*

Be it known that I, GEORGE W. NORTH, of Burlington, in the county of Coffey and State of Kansas, have invented a new and useful Improvement in Check-Row Planters, of which the following is a full, clear, and exact description, reference being had to the annexed drawings, forming part of this specification.

The object of this invention is to provide a planter which shall combine light weight, simplicity of construction, and accuracy in dropping grain.

The invention belongs to the class of planters in which the grain to be planted and the dropping mechanism, which includes an oscillating cup, are located in chambers formed within the wheels.

Figure 1:
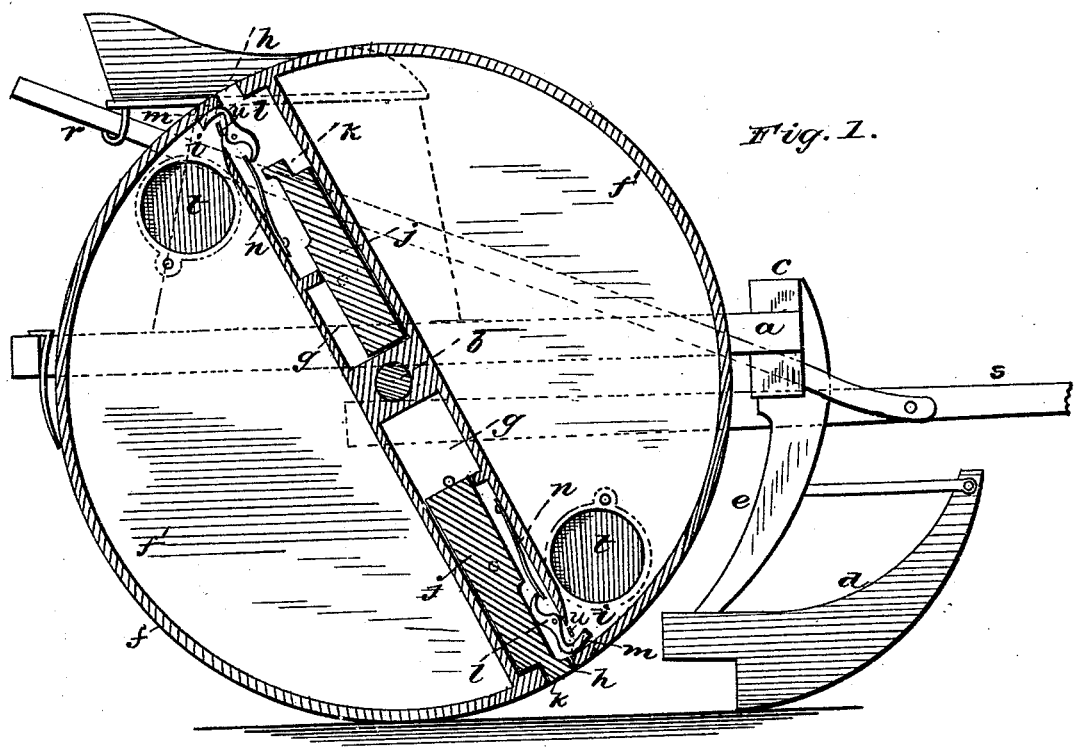
Figure 2:
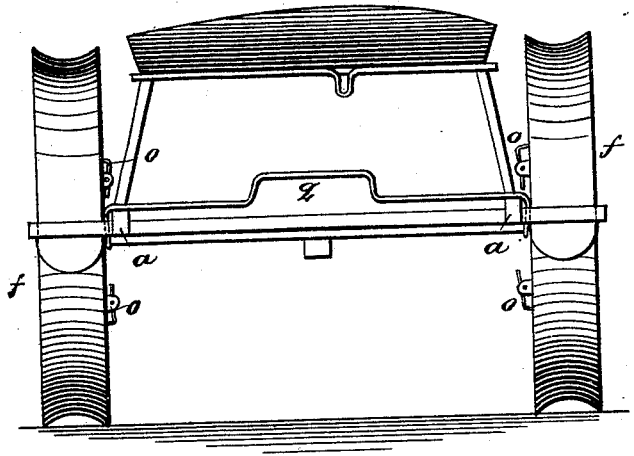
Figure 3:
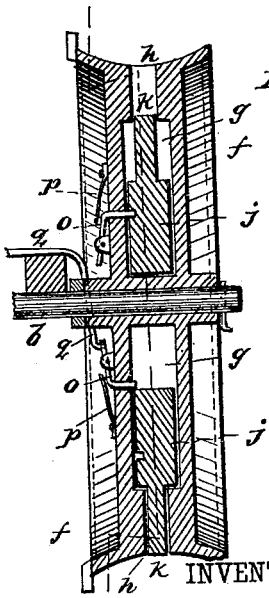

In the accompanying drawings, Figure 1 is a side elevation, partly in section, of my improved check-row planter. Fig. 2 is a rear elevation of the same, and Fig. 3 is a sectional view of one of the wheels.

The frame-work of the planter consists simply of two side bars, $a$ $a$, secured to an iron axle, $b$, and a cross-bar, $c$, in front, to which the runners $d$ $d$ and the drills $e$ $e$ are attached. The wheels $f f$ are made hollow and provided with two radial chambers, $g$ $g$, which are in line with each other and separated by the hub. The said chambers are provided with openings $h$ in the periphery of the wheel, and also with openings $i$ adjacent to the rim on corresponding sides of the chambers, communicating with the semicircular chambers $f'f'$, which are formed by the remaining portion of the wheel. Within each chamber $g$ is a trip-slide, $j$, made somewhat shorter than the chamber, and having a projection, $k$, which is adapted to close the opening $h$ when the slide is allowed to move by gravity toward the rim of the wheel. The slide is made smaller than the chamber $g$ on one side, and in this space is pivoted a dog, $l$, so arranged that a cup, $m$, on one end thereof shall project through the opening $i$ into the chamber $f'$. A spring, $n$, is also secured within this space in such manner that one end thereof shall engage with the dog $l$ and tend to hold it in position to close the opening $i$. A suitable recess is formed in the trip-slide to accommodate the dog, when the slide has closed the opening $h$, and a lug on the wall of the chamber, in line with the spring $n$ and dog $l$, serves to hold the slide in position as it moves back and forth in its chamber.

On the inside of the wheel, without the chamber $g$, is pivoted a catch, $o$, having one end bent to enter a perforation in the wall of said chamber, whereby it shall engage with a recess in the slide $j$ to hold the slide in position until the wheel brings the opening $h$ to the desired point. A spring, $p$, serves to hold the catch in engagement with the slide, and a bar, $q$, arranged parallel with the axle and having its ends bent downward to engage with the ends of the catches $o$, serves to trip the catches as the wheel revolves. The tripping of the catches is thus rendered automatic, and the gravity-slide, being released at the required point, trips the dog and causes its cup, which is formed with an open bottom, to register with the opening in the periphery of the wheel, whereby a suitable quantity of grain is dropped through the said opening.

The drills $e$ $e$ are made open, and are bent to conform to the periphery of the wheel, so that the grain shall drop from the wheel into the drill and be conveyed to the ground thereby. The object of this arrangement is to plant the grain at any desired depth, since the drills are made adjustable by means of a lever, $r$, secured thereto and pivoted to the tongue $s$. The chambers $f'f'$ are provided with hand-holes $t$, through which grain is to be introduced, and through which a strip of leather, $u$, for brushing off the grain, is to be inserted or taken out for repairs when necessary.

It is evident that my planter may be constructed with one or any desired number of wheels and drills. In check-rowing suitable projections will be secured to the periphery of the wheels to mark the planted hills, in the usual manner.

Having thus described my invention, what I claim as new, and desire to secure by Letters Patent, is—

1. In a seed-planter having chambered wheels for carrying the grain, the combination, with oscillatory cups pivoted in openings leading from the chambers through the periphery of the wheels, of gravity trip-slides arranged in radial chambers and having retaining-catches which are tripped by a stationary arm on the axle, substantially as shown and described.

2. The combination, with the spring-actuated dogs $l$, pivoted in radial chambers $g$, and carrying the seed-cups $m$, of the gravity-slides $j$, having projections $k$ for tripping the dogs, and recesses for receiving the latter, substantially as shown and described.

3. The combination, with the trip-slides $j$, arranged to operate by gravity in radial chambers in the wheels, and having recesses therein, of the spring-actuated catches $o$, pivoted on the inner side of the wheels, without the said chambers, and adapted to engage with the slides, and the bar $q$, having arms adapted to release the catches, substantially as shown and described.

4. The combination, with the wheels $f$, of the open drills $e$, bent to conform to the periphery of the wheels, and the drill-adjusting lever $r$, pivoted to the tongue in front of the drills and extending back to the seat, substantially as shown and described.

5. The combination, with the dogs $l$, pivoted in radial chambers $g$, and having cups $m$, which oscillate through openings leading to the chambers $f'$, of the strips of leather $u$, secured in the said openings above the cups to act as a brush, substantially as shown and described.

GEORGE W. NORTH.

Witnesses:
 W. B. PATTON,
 W. H. THROCKMORTON.